United States Patent Office 2,790,564
Patented Apr. 30, 1957

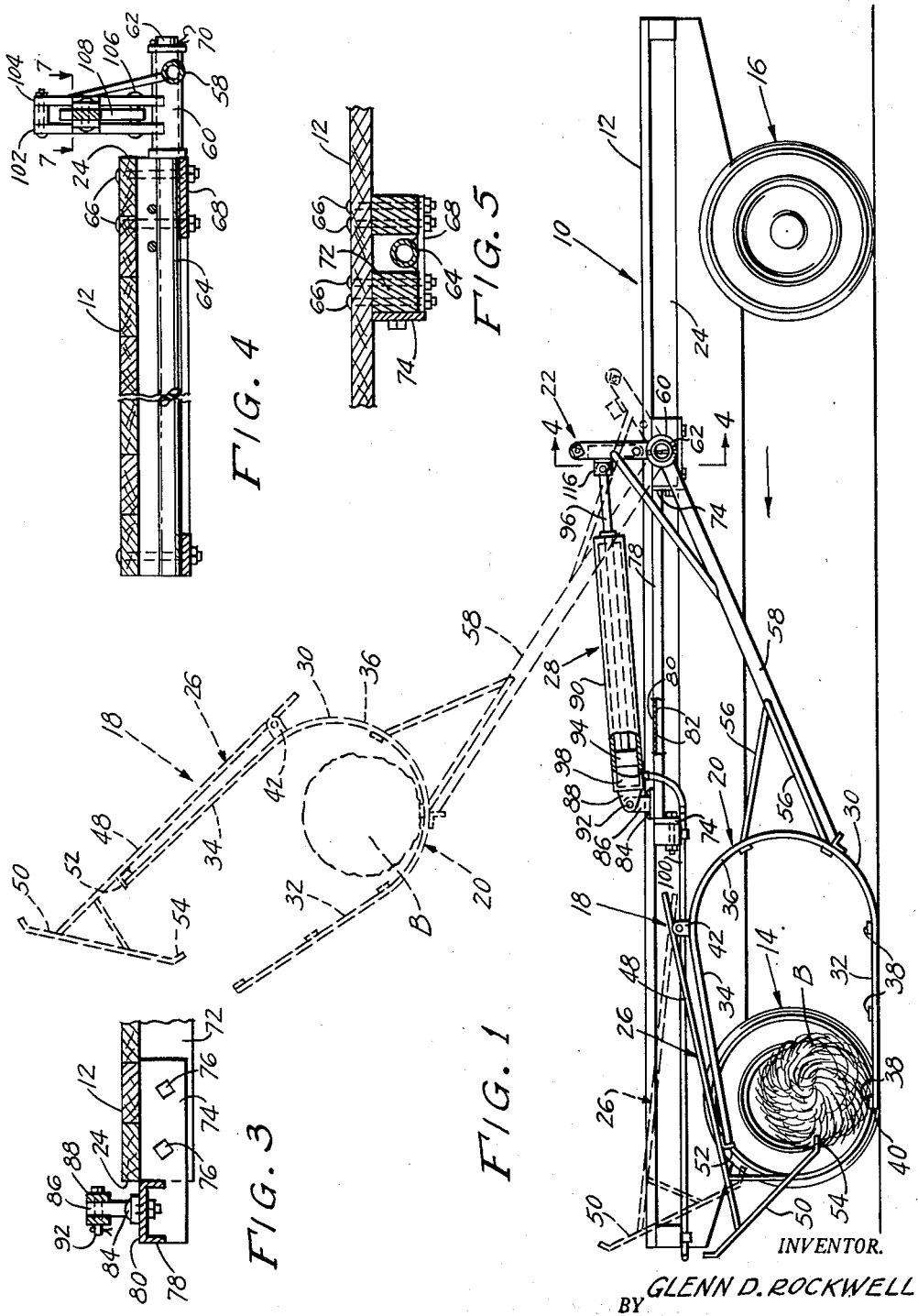

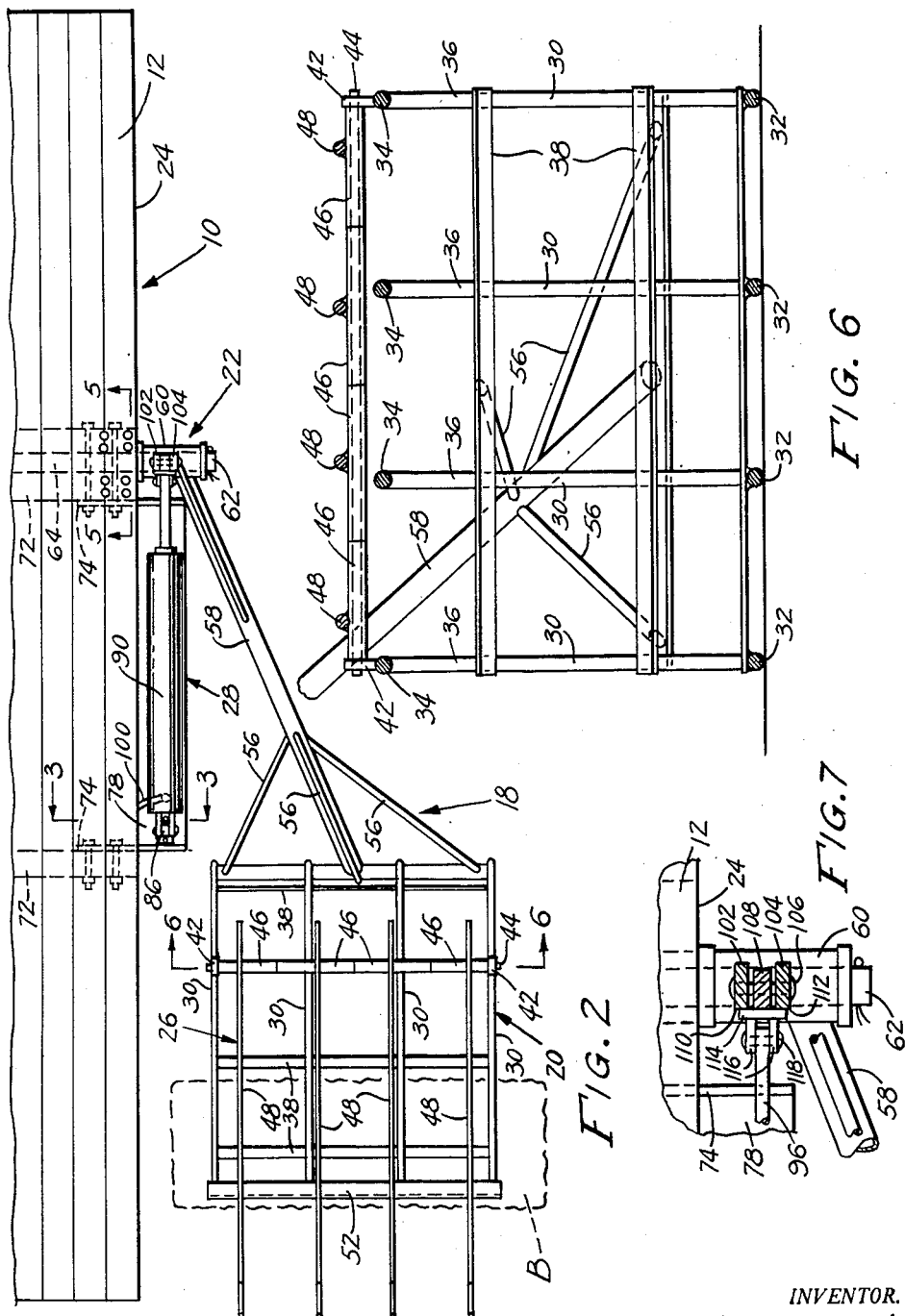

2,790,564

BALE-LIFTING ASSEMBLY FOR VEHICLES

Glenn D. Rockwell, Maquoketa, Iowa

Application March 16, 1956, Serial No. 572,128

10 Claims. (Cl. 214—78)

This invention relates generally to article handling apparatus and is more particularly concerned with a novel bale-lifting assembly for forwardly moving loading vehicles.

A primary object of invention is to provide a novel bale-lifting assembly comprising a scoop member including a leading edge portion engageable beneath a bale to be lifted and a trailing vertical abutment portion engageable with a bale received on said scoop member during positioning thereon and lifting of the bale, said scoop member being vertically pivotal in laterally disposed relationship on a loading vehicle, force transmitting means for vertically pivoting the scoop member relative to the loading vehicle after a bale is disposed thereon, and a freely journaled vertically pivotal bale-actuated retaining assembly carried on the scoop member and including a cam-shoe portion extending forwardly of the leading edge portion of the scoop member for permitting bales to be disposed thereon and for retaining said bales against movement off said scoop member.

Another object of invention in conformance with that set forth is to provide in a bale-lifting assembly of the character set forth lost motion means between the force transmitting means and the scoop member permitting free vertical pivotal movement of the scoop member when encountering rough terrain.

Further objects of invention in conformance with that set forth reside in the combination of the novel bale-lifting assembly with a loading vehicle, and include specific details of the various cooperating parts.

And yet another object of invention in conformance with that set forth is to provide a novel bale-lifting assembly of the character set forth which is readily and economically manufactured, easily installed and maintained, and highly satisfactory, serviceable and utilitarian for the purpose intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of a loading vehicle with the novel self-loading bale-lifting assembly mounted thereon, showing in dotted lines the position of a bale retaining assembly for said lifting assembly, and the position assumed by the bale-lifting assembly when the bale has been lifted, including portion broken away and shown in section for clarity;

Figure 2 is a top plan view of the novel self-loading bale-lifting assembly on a fragmentary side portion of a loading vehicle;

Figure 3 is an enlarged fragmentary sectional view taken substantially on line 3—3 of Figure 2;

Figure 4 is an enlarged fragmentary sectional view taken substantially on line 4—4 of Figure 1 showing details of the lost motion means for journaling the bale-lifting assembly on the loading vehicle;

Figure 5 is an enlarged fragmentary sectional view taken substantially on line 5—5 of Figure 2;

Figure 6 is an enlarged sectional view taken substantially on line 6—6 of Figure 2; and Figure 7 is a further enlarged fragmentary sectional view taken substantially on line 7—7 of Figure 4, with portions broken away for clarity, showing details of the lost motion means for journaling the bale-lifting assembly on the loading vehicle.

Referring to the drawings in detail, a forwardly moving loading vehicle is indicated generally at 10, said loading vehicle being a hayrack, self-propelled truck or the like, and including a loading platform 12 having suitably journaled thereon in any suitable manner forward and rear wheel assemblies indicated generally at 14 and 16, respectively. As will subsequently become apparent, the forward movement of the loading vehicle 10 will result in a bale disposed on a support surface being lifted onto a self-loading bale-lifting assembly indicated generally at 18 said lifting assembly being readily usable with cylindrical bales B as shown in Figure 1, also being usable with square bales if desired. As seen in the dotted line position of the bale-lifting assembly in Figure 1, the bale will be lifted to a suitable position wherein a person disposed on the upper surface of the loading platform of the vehicle 10 may readily and expeditiously remove the bale from said lifting assembly.

The self-loading bale-lifting assembly 18 includes a scoop member indicated generally at 20, journal means indicated generally at 22 for pivotally mounting the bale-lifting assembly in an offset vertically pivotal position adjacent one side portion 24 of the loading platform 12 of the vehicle 10. The bale-lifting assembly also includes a vertically pivotal bale-actuated retaining assembly indicated generally at 26 for permitting movement of the bale B onto the scoop member 20 and retaining the same from movement thereoff until the bale is lifted into the dotted line position of Figure 1. Also included in operative engagement with the journal means 22 in a laterally extending supported position adjacent the side 24 of the platform 12 of the vehicle is power means indicated generally at 28.

The scoop member 20 comprises a plurality of tine elements 30 which are U-shaped in elevation and include lower and upper leg portions 32 and 34 connected to a rear bight portion 36. The tine elements 30 are suitably secured in transverse spaced relationship by means of transveres brace elements 38 which extend about the inner periphery of said tine elements providing a raised friction surface for aiding in retaining the bale B on the upper surface of the lower leg elements 32, see Figure 1, the spaced relationship of the tine elements permitting debris picked up by the scoop member 20 to remain on the support surface when the bale is lifted. The scoop member 20 includes a forward or leading edge portion 40 comprising the forward ends of the lower leg elements 32 which is engageable beneath the bale B when the loading vehicle 10 is moved forwardly as indicated by the direction arrow of Figure 1. The bight portion 36 of the tine elements comprises a vertical abutment portion engageable with the bale B when the loading vehicle moves forward as well as retaining the bale on the scoop member when the bale is lifted as seen in Figure 1. The lower leg elements 32 of the tine elements comprises a skid portion slidingly engageable over the support surface upon which the bale B has been deposited.

Suitably secured in upwardly extending relationship relative to the upper leg portions 34 of the tine elements are journal bracket ear portions or elements 42, see Figure 2, which receive therein at suitably aligned apertures a support shaft 44 defining a horizontal pivot axis for the vertically pivotal retaining assembly 26. The shaft 44 has journaled thereon a plurality of longitudinally aligned sleeve elements 46 which have extending transversely therefrom elongated rod elements 48 terminating at their forward ends in an angulated cam-shoe portion 50 which extends in overlying forward relationship relative to the leading or forward edge 40 of the tine elements 30. The cam-shoe portions 50 together comprise a cam-shoe portion for the scoop member 20 and extend in rearwardly angular relationship relative to the leading edge of said scoop member and when engaged by the bale B will be urged to the raised position shown by the dotted lines of Figure 1 wherein the bale B may be moved on top of the upper surface of the lower leg portions 32 of said tine elements. The elongated rods 40 and cam-shoe portions 50 are engageable with a transverse stop bar 52 suitably secured on the forward ends of the upper leg portions 34 of said tine elements. The sleeves 46 and accordingly the elongated elements 48 and cam-shoe portions 50 thereof are freely journaled on the shaft 48 permitting the aforementioned raising of said bale-actuated retaining assembly 26 as previously mentioned. The lower end portions 54 of the cam shoe portions 50 will prevent the bale B from moving off the scoop member 20, see Figure 1.

Suitably secured and braced by means of members 56 from the rear of the scoop member 20 is an elongated trailing support bar 58 which is secured to a transverse journal sleeve 60, see Figure 7, providing a pivot axis element for vertical pivotal movement of the entire scoop member and bale retaining assembly as shown in Figure 1. The sleeve 60 is journaled on a laterally extending axle element 62, said axle element 62 being received in a transversely disposed tubular rod 64 suitably secured in underlying relationship by means of bolt assemblies 66 and mounting plate 68 on the undersurface of the loading platform 12, see Figure 5. A suitable cotter pin element 70 may extend through the end of the axle 62 permitting ready removal of the bale-lifting assembly therefrom.

Suitably secured on lower transverse brace members 72, for example, on the lower surface of the platform 12 of the vehicle, are laterally extending mounting plates 74, being secured thereon by means of transverse bolt elements 76, for example, see Figure 3, said plates 74 extending beyond the side edge 24 of the loading platform and being secured to opposite ends of a mounting channel 78 which extends in parallel relationship adjacent the side edge 24 of said loading platform. The channel member 78 includes an upper horizontally disposed web portion 80 which is suitably apertured at 82, see Figure 1, for receiving therethrough suitable fastening bolts 84 for mounting thereon a vertically extending pivot ear element 86 to which bifurcated ear portion 88 of a fluid cylinder 90 of the force transmitting means 28 is suitably pivoted by means of a transverse pivot pin 92, see Figure 3. The apertures 82 extend along a substantial length of the web 80 of the channel member 78 permitting the utilization of different lengths of fluid cylinders 90 with the assembly, making the assembly adaptable to 8, 10 and 12 inch cylinders which are the conventional sizes utilized in the art.

The fluid cylinder 90 includes therein a suitable piston 94 integrally connected to an extendible piston rod 96 for a purpose to subsequently become apparent. The piston 94 defines in the fluid cylinder 90 a pair of oppositely disposed variable volume chambers the chamber 98 of which being in communication to a suitably connected flexible fluid transmitting conduit 100 connected to a suitable pressure source whereby extension of the piston rod 96 will result in raising the bale-lifting assembly to the position shown in the dotted lines of Figure 1.

Inasmuch as the scoop member 20 will be moving over uneven terrain there is incorporated in the journal means 22 of the bale-lifting assembly, said journal means including the journal sleeve 60 previously described, lost motion means which permits vertical pivotal movement of the scoop member 20 without materially affecting or damaging the force transmitting means 28 which includes the fluid cylinder 90 and piston rod 96. Said lost motion means comprises a pair of spaced vertically extending lever elements 102 and 104, see Figures 1, 2, 4 and 7, which have extending transversely between an intermediate portion thereof a pivot pin element 106 which has pivotally mounted thereon a lever element 108. The elements 102 and 104 constitute first lever elements which are integral with the sleeve 60 and which will pivot therewith, and the lever element 108 constitutes a second lever element which is movable with the piston rod 96 for the purpose of raising the bale-lifting assembly. Considering Figure 7, the first lever element may pivot toward the right, as seen in Figure 7 when rough or hilly terrain is encountered by the scoop member, relative to the second lever element 108 by virtue of the pivot pin 106. The elements 102 and 104 are engaged at their forward edge portions 110 and 112, respectively, by means of a transverse abutment element 114 suitably secured in transverse relationship on the forward edge of the second lever element 108. Extending forwardly from the abutment element 114 are a pair of spaced pivot ear elements 116 which receive therethrough a transverse pivot pin element 118 extending through a suitable aperture portion in the piston rod 96. Thus when the piston rod 96 is extended rearwardly relative to the platform 12 of the vehicle 10, the bale-lifting assembly will be raised to the position shown in Figure 1 by the application of fluid pressure in the chamber 98 of the force transmitting means. Relief of said pressure permits the assembly to be returned to the solid line position shown in Figure 1.

Thus there has been disclosed a novel self-loading bale-lifting assembly which fully conforms with the objects of invention heretofore set forth.

Various positional directional terms such as "forward," "rearward," etc., are utilized herein and have only a relative connotation to aid in describing the device and it is not intended to require any particular orientation with respect to any external elements.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the appended claims.

What is claimed as new is as follows:

1. A self-loading bale-lifting assembly for use on a forwardly moving loading vehicle comprising a scoop member including a skid portion slidingly engageable on a support surface upon which baled material is disposed, said skid portion terminating in a leading edge portion engageable beneath baled material disposed on said support surface, said skid portion including a trailing vertical abutment portion engageable with baled material to be received on the scoop member, journal means on the scoop member for mounting the scoop member in laterally extending and vertically pivotal relationship adjacent a side portion of the forwardly moving loading vehicle, force transmitting means engaging the journal means for raising the scoop member above the loading vehicle, and a vertically pivotal bale-actuated retaining assembly including a body portion freely journaled at one end on an upper portion of the scoop member in overlying relationship to said skid portion, said body portion including a cam-shoe portion extending in overlying relationship beyond the leading edge portion of the scoop member, said cam-shoe portion including an angular cam face extending toward the leading edge portion of the scoop member and engageable with the baled material to be lifted for raising the retaining assembly and retaining baled material disposed on the scoop member due to forward movement of the loading vehicle and permitting subsequent raising of the bale-lifting assembly.

2. A self-loading bale-lifting assembly for use on a forwardly moving loading vehicle comprising a scoop member including a skid portion slidingly engageable on a support surface upon which baled material is disposed, said skid portion terminating in a leading edge portion engageable beneath baled material disposed on said support surface, said skid portion including a trailing vertical abutment portion engageable with baled material to be received on the scoop member, journal means on the scoop member for mounting the scoop member in laterally extending and vertically pivotal relationship adjacent a side portion of the forwardly moving loading vehicle, force transmitting means engaging the journal means for raising the scoop member above the loading vehicle, and a vertically pivotal bale-actuated retaining assembly including a body portion freely journaled at one end on an upper portion of the scoop member in overlying relationship to said skid portion, said body portion including a cam-shoe portion extending in overlying relationship beyond the leading edge portion of the scoop member, said cam-shoe portion including an angular cam face extending toward the leading edge portion of the scoop member and engageable with the baled material to be lifted for raising the retaining assembly and retaining baled material disposed on the scoop member due to forward movement of the loading vehicle and permitting subsequent raising of the bale-lifting assembly, said scoop member including an open side portion defined by a plurality of U-shaped tine elements secured in spaced relationship and including upper and lower leg portions connected by a bight portion, the lower leg and bight portions of said tine elements respectively comprising the skid and trailing vertical abutment portions of said scoop member.

3. A self-loading bale-lifting assembly for use on a forwardly moving loading vehicle comprising a scoop member including a skid portion slidingly engageable on a support surface upon which baled material is disposed, said skid portion terminating in a leading edge portion engageable beneath baled material disposed on said support surface, said skid portion including a trailing vertical abutment portion engageable with baled material to be received on the scoop member, journal means on the scoop member for mounting the scoop member in laterally extending and vertically pivotal relationship adjacent a side portion of the forwardly moving loading vehicle, force transmitting means engaging the journal means for raising the scoop member above the loading vehicle, and a vertically pivotal bale-actuated retaining assembly including a body portion freely journaled at one end on an upper portion of the scoop member in overlying relationship to said skid portion, said body portion including a cam-shoe portion extending in overlying relationship beyond the leading edge portion of the scoop member, said cam-shoe portion including an angular cam face extending toward the leading edge portion of the scoop member and engageable with the baled material to be lifted for raising the retaining assembly and retaining baled material disposed on the scoop member due to forward movement of the loading vehicle and permitting subsequent raising of the bale-lifting assembly, said scoop member including an open side portion defined by a plurality of U-shaped tine elements secured in spaced relationship and including upper and lower leg portions connected by a bight portion, the lower leg and bight portions of said tine elements respectively comprising the skid and trailing vertical abutment portions of said scoop member, the upper leg portions of the tine elements including a stop bar extending transversely therebetween, an intermediate portion of the body portion of the bale-actuated retaining assembly engageable with said stop bar for orienting the cam-shoe portion in an overlying forward position relative to the leading edge portion of the scoop member.

4. A self-loading bale-lifting assembly for use on a forwardly moving loading vehicle comprising a scoop member including a skid portion slidingly engageable on a support surface upon which baled material is disposed, said skid portion terminating in a leading edge portion engageable beneath baled material disposed on said support surface, said skid portion including a trailing vertical abutment portion engageable with baled material to be received on the scoop member, journal means on the scoop member for mounting the scoop member in laterally extending and vertically pivotal relationship adjacent a side portion of the forwardly moving loading vehicle, force transmitting means engaging the journal means for raising the scoop member above the loading vehicle, and a vertically pivotal bale-actuated retaining assembly including a body portion freely journaled at one end on an upper portion of the scoop member in overlying relationship to said skid portion, said body portion including a cam-shoe portion extending in overlying relationship beyond the leading edge portion of the scoop member, said cam-shoe portion including an angular cam face extending toward the leading edge portion of the scoop member and engageable with the baled material to be lifted for raising the retaining assembly and retaining baled material disposed on the scoop member due to forward movement of the loading vehicle and permitting subsequent raising of the bale-lifting assembly, the journal means on the scoop member including lost motion means permitting free vertical pivotal movement of the scoop member relative to the force transmitting means during forward movement of the scoop member over rough terrain.

5. A self-loading bale-lifting assembly for use on a forwardly moving loading vehicle comprising a scoop member including a skid portion slidingly engageable on a support surface upon which baled material is disposed, said skid portion terminating in a leading edge portion engageable beneath baled material disposed on said support surface, said skid portion including a trailing vertical abutment portion engageable with baled material to be received on the scoop member, journal means on the scoop member for mounting the scoop member in laterally extending and vertically pivotal relationship adjacent a side portion of the forwardly moving loading vehicle, force transmitting means engaging the journal means for raising the scoop member above the loading vehicle, and a vertically pivotal bale-actuating retaining assembly including a body portion freely journaled at one end on an upper portion of the scoop member in overlying relationship to said skid portion, said body portion including a cam-shoe portion extending in overlying relationship beyond the leading edge portion of the scoop member, said cam-shoe portion including an angular cam face extending toward the leading edge portion of the scoop member and engageable with the baled material to be lifted for raising the retaining assembly and retaining baled material disposed on the scoop member due to forward movement of the loading vehicle and permitting subsequent raising of the bale-lifting assembly, the journal means on the scoop member including lost motion means permitting free vertical pivotal movement of the scoop member relative to the force transmitting means during forward movement of the scoop member over rough terrain, the scoop member including an elongated trailing support bar including one end secured to the trailing vertical abutment portion, the journal means being secured to the other end portion of said support bar and including a transverse pivot axis element rotatably supporting the scoop member on a horizontal axle element extending laterally from the side of the loading vehicle, the lost motion means comprising a first lever element secured normal to the pivot axis element, a second lever element vertically pivoted at one end on an intermediate portion of said first lever element, said second lever element including a transverse abutment portion engageable with a forward edge portion of the first lever element, the force transmitting means including one end portion connectable on a horizontal pivot axis portion on a side portion of the loading vehicle, said force transmitting means including an extendible force transmitting rod including a terminal end portion connected to a horizontal pivot axis portion intermediately located on the second lever element.

6. In combination, a forwardly movable loading vehicle including an elevated loading platform, and a self-loading bale-lifting assembly, said bale-lifting assembly comprising a scoop member including a skid portion slidingly engageable on a support surface upon which baled material is disposed, said skid portion terminating in a leading edge portion engageable beneath baled material disposed on said support surface, said skid portion including a trailing vertical abutment portion engageable with baled material to be received on the scoop member, journal means on the scoop member mounting the scoop member in laterally extending and vertically pivotal relationship adjacent a side portion of the forwardly moving loading platform, force transmitting means on the loading platform in engagement with the journal means for raising the scoop member above the loading vehicle platform, and a vertically pivotal bale-actuated retaining assembly including a body portion freely journaled at one end on an upper portion of the scoop member in overlying relationship to said skid portion, said body portion including a cam-shoe portion extending in overlying relationship beyond the leading edge portion of the scoop member, said cam-shoe portion including an angular cam face extending toward the leading edge portion of the scoop member and engageable with the baled material to be lifted for raising the retaining assembly and retaining baled material disposed on the scoop member due to forward movement of the loading vehicle and permitting subsequent raising of the bale-lifting assembly.

7. In combination, a forwardly movable loading vehicle including an elevated loading platform, and a self-loading bale-lifting assembly, said bale-lifting assembly comprising a scoop member including a skid portion slidingly engageable on a support surface upon which baled material is disposed, said skid portion terminating in a leading edge portion engageable beneath baled material disposed on said support surface, said skid portion including a trailing vertical abutment portion engageable with baled material to be received on the scoop member, journal means on the scoop member mounting the scoop member in laterally extending and vertically pivotal relationship adjacent a side portion of the forwardly moving loading platform, force transmitting means on the loading platform in engagement with the journal means for raising the scoop member above the loading vehicle platform, and a vertically pivotal bale-actuated retaining assembly including a body portion freely journaled at one end of an upper portion of the scoop member in overlying relationship to said skid portion, said body portion including a cam-shoe portion extending in overlying relationship beyond the leading edge portion of the scoop member, said cam-shoe portion including an angular cam face extending toward the leading edge portion of the scoop member and engageable with the baled material to be lifted for raising the retaining assembly and retaining baled material disposed on the scoop member due to forward movement of the loading vehicle and permitting subsequent raising of the bale-lifting assembly, said scoop member including an open side portion defined by a plurality of U-shaped tine elements secured in spaced relationship and including upper and lower leg portions connected by a bight portion, the lower leg and bight portions of said tine elements respectively comprising the skid and trailing vertical abutment portions of said scoop member.

8. In combination, a forwardly movable loading vehicle including an elevated loading platform, and a self-loading bale-lifting assembly, said bale-lifting assembly comprising a scoop member including a skid portion slidingly engageable on a support surface upon which baled material is disposed, said skid portion terminating in a leading edge portion engageable beneath baled material disposed on said support surface, said skid portion including a trailing vertical abutment portion engageable with baled material to be received on the scoop member, journal means on the scoop member mounting the scoop member in laterally extending and vertically pivotal relationship adjacent a side portion of the forwardly moving loading platform, force transmitting means on the loading platform in engagement with the journal means for raising the scoop member above the loading vehicle platform, and a vertically pivotal bale-actuated retaining assembly including a body portion freely journaled at one end of an upper portion of the scoop member in overlying relationship to said skid portion, said body portion including a cam-shoe portion extending in overlying relationship beyond the leading edge portion of the scoop member, said cam-shoe portion including an angular cam face extending toward the leading edge portion of the scoop member and engageable with the baled material to be lifted for raising the retaining assembly and retaining baled material disposed on the scoop member due to forward movement of the loading vehicle and permitting subsequent raising of the bale-lifting assembly, said scoop member including an open side portion defined by a plurality of U-shaped tine elements secured in spaced relationship and including upper and lower leg portions connected by a bight portion, the lower leg and bight portions of said tine elements respectively comprising the skid and trailing vertical abutment portions of said scoop member, the upper leg portions of the tine elements including a stop bar extending transversely therebetween, an intermediate portion of the body portion of the bale-actuated retaining assembly engageable with said stop bar for orienting the cam-shoe portion in an overlying forward position relative to the leading edge portion of the scoop member.

9. In combination, a forwardly movable loading vehicle including an elevated loading platform, and a self-loading bale-lifting assembly, said bale lifting assembly comprising a scoop member including a skid portion slidingly engageable on a support surface upon which baled material is disposed, said skid portion terminating in a leading edge portion engageable beneath baled material disposed on said support surface, said skid portion including a trailing vertical abutment portion engageable with baled material to be received on the scoop member, journal means on the scoop member mounting the scoop member in laterally extending and vertically pivotal relationship adjacent a side portion of the forwardly moving loading platform, force transmitting means on the loading platform in engagement with the journal means for raising the scoop member above the loading vehicle platform, and a vertically pivotal bale-actuated retaining assembly including a body portion freely journaled at one end on an upper portion of the scoop member in overlying relationship to said skid portion, said body portion including a cam-shoe portion extending in overlying relationship beyond the leading edge portion of the scoop member, said cam-shoe portion including an angular cam face extending toward the leading edge portion of the scoop member and engageable with the baled material to be lifted for raising the retaining assembly and retaining baled material disposed on the scoop member due to forward movement of the loading vehicle and permitting subsequent raising of the bale-lifting assembly, the journal means on the scoop member including lost motion means permitting free vertical pivotal movement of the scoop member relative to the force transmitting means during forward movement of the scoop member over rough terrain.

10. In combination, a forwardly movable loading vehicle including an elevated loading platform, and a self-loading bale-lifting assembly, said bale-lifting assembly comprising a scoop member including a skid portion slidingly engageable on a support surface upon which baled material is disposed, said skid portion terminating in a leading edge portion engageable beneath baled material disposed on said support surface, said skid portion including a trailing vertical abutment portion engageable with baled material to be received on the scoop member, journaled means on the scoop member mounting the scoop member in laterally extending and vertically pivotal relationship adjacent a side portion of a forwardly moving loading platform, force transmitting means on the loading platform in engagement with the journal means for raising the scoop member above the loading vehicle platform, and a vertically pivotal bale-actuated retaining assembly including a body portion freely journaled at one end on an upper portion of the scoop member in overlying relationship to said skid portion, said body portion including a cam-shoe portion extending in overlying relationship beyond the leading edge portion of the scoop member, said cam-shoe portion including an angular cam face extending toward the leading edge portion of the scoop member and engageable with the baled material to be lifted for raising the retaining assembly and retaining baled material disposed on the scoop member due to forward movement of the loading vehicle and permitting subsequent raising of the bale-lifting assembly, the journal means on the scoop member including lost motion means permitting free vertical pivotal movement of the scoop member relative to the force transmitting means during forward movement of the scoop member over rough terrain, the scoop member including an elongated trailing support bar including one end secured to the trailing vertical abutment portion, the journal means being secured to the other end portion of said support bar and including a transverse pivot axis element rotatably supporting the scoop member on a horizontal axis element extending laterally from the side of the vehicle loading platform, the lost motion means comprising a first lever element secured normal to the pivot axis element, a second lever element vertically pivoted at one end on an intermediate portion of said first lever element, said second lever element including a transverse abutment portion engageable with a forward edge portion of the first lever element, the force transmitting means including one end portion journaled on a horizontal pivot axis portion on a side portion of the loading platform, said force transmitting means including an extendible force transmitting rod including a terminal end portion connected to a horizontal pivot axis portion intermedately located on the second lever element.

References Cited in the file of this patent
UNITED STATES PATENTS

| | | |
|---|---|---|
| 2,412,643 | Maki | Dec. 17, 1946 |
| 2,531,070 | McDermott | Nov. 21, 1950 |
| 2,704,164 | David | Mar. 15, 1955 |
| 2,707,058 | Fischer | Apr. 26, 1955 |
| 2,757,807 | Ringness | Aug. 7, 1956 |
| 2,758,729 | Van Dusen | Aug. 14, 1956 |